US012625867B1

(12) United States Patent
Giuliano et al.

(10) Patent No.: US 12,625,867 B1
(45) Date of Patent: May 12, 2026

(54) DETERMINING A RESULT FILTER FOR REQUESTS TO KEY-VALUE DATA STORES

(71) Applicant: Amazon Technologies, Inc., Seattle, WA (US)

(72) Inventors: Andrea Giuliano, Dublin (IE); Robert Crossan, Foxrock (IE)

(73) Assignee: Amazon Technologies, Inc., Seattle, WA (US)

( * ) Notice: Subject to any disclaimer, the term of this patent is extended or adjusted under 35 U.S.C. 154(b) by 14 days.

(21) Appl. No.: 17/364,797

(22) Filed: Jun. 30, 2021

(51) Int. Cl.
| | |
|---|---|
| *G06F 16/242* | (2019.01) |
| *G06F 16/2455* | (2019.01) |
| *G06F 16/2457* | (2019.01) |
| *G06F 16/248* | (2019.01) |

(52) U.S. Cl.
CPC ...... *G06F 16/244* (2019.01); *G06F 16/24564* (2019.01); *G06F 16/24573* (2019.01); *G06F 16/248* (2019.01)

(58) Field of Classification Search
None
See application file for complete search history.

(56) References Cited

U.S. PATENT DOCUMENTS

| | | | | |
|---|---|---|---|---|
| 6,366,926 | B1 * | 4/2002 | Pohlmann | ............... G06F 9/542 |
| 7,062,502 | B1 * | 6/2006 | Kesler | .................. G06F 16/252 |
| | | | | 707/999.005 |
| 9,471,711 | B2 | 10/2016 | Abadi et al. | |
| 9,971,526 | B1 * | 5/2018 | Wei | .......................... G06F 3/064 |
| 9,990,398 | B2 | 6/2018 | Hunter et al. | |
| 10,565,203 | B1 * | 2/2020 | Lashmet | ............... G06F 16/284 |
| 10,579,589 | B2 * | 3/2020 | Gandhi | ................. G06F 16/148 |
| 10,685,003 | B2 * | 6/2020 | Shuman | ............. G06F 16/2255 |
| 2005/0160125 | A1 * | 7/2005 | Chatfield | ........... H03H 17/0261 |
| | | | | 708/300 |
| 2005/0210023 | A1 | 9/2005 | Barrera et al. | |
| 2009/0012941 | A1 * | 1/2009 | Schaaf | ............... G06F 16/9027 |
| 2014/0164405 | A1 * | 6/2014 | Tsai | .................... G06F 21/6227 |
| | | | | 707/754 |
| 2014/0222870 | A1 * | 8/2014 | Zhang | ................. G06F 16/2246 |
| | | | | 707/797 |
| 2019/0068690 | A1 * | 2/2019 | Canton | ................... H04L 41/40 |
| 2022/0004571 | A1 * | 1/2022 | Ganapathy | ......... G06F 16/3326 |
| 2022/0342589 | A1 * | 10/2022 | Dovzhenko | ............. G06F 3/061 |
| 2023/0259509 | A1 * | 8/2023 | Wang | ............... G06F 16/24542 |
| | | | | 707/718 |

* cited by examiner

*Primary Examiner* — Dawaune A Conyers

(74) *Attorney, Agent, or Firm* — S. Scott Foster; Kowert, Hood, Munyon, Rankin & Goetzel, P.C.

(57) ABSTRACT

Results for search requests to key-value data stores may be dynamically filtered. A search request may include keys for performing the search request with respect to key value data stores. The number of values for the keys included in the key value data store may be used to determine filtering criteria for the search request. The filtering criteria may be applied as part of generating a result for the search request.

20 Claims, 8 Drawing Sheets other
service(s)
220 metrics
collection
212 event
detection and
handling
214 metadata
management
216 metadata-
based metrics
search
218 monitoring service 210 provider network 200 network
260 client(s)
250

```
search request 510

{
    "Action": Select,
    "Match": {
        "ResourceType":"resourceA",
        "Labels": [
            { "Key": "group-A"},
            { "Key": "env", "Value": "prod"},
            { "Key": "resource-type", "Value":"XL-1"},
            { "Key": "resource-type", "Value":"XL-2"}
        ]
    }
}
```

⇩

| key groups 520 | |
|---|---|
| group-A | |
| env | prod |
| resource-type | XL-1, XL-2 |

⇩ filter criteria 530

> anyLabel -> key == group-A

> AND

> anyLabel -> key == env, value == prod

> AND

> anyLabel -> key == resource-type, value == XL-1
> OR
> anyLabel -> key == resource-type, value == XL-2

*FIG. 5*

DETERMINING A RESULT FILTER FOR REQUESTS TO KEY-VALUE DATA STORES

BACKGROUND

Key-value data stores offer a flexible storage solution for managing different data sets. Data stored in a key-value data store may be accessed utilizing a key value that identifies the data. Identifying data in this way allows for a key-value data store to store data with differing values, fields, characteristics, sizes, or other differences in the same data store.

BRIEF DESCRIPTION OF THE DRAWINGS

FIG. 5 is a logical block diagram illustrating the evaluation of a search request to determine filter criteria, in some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various techniques of determining a result filter for requests to key-value data stores are described herein. Key-value data stores may support different interface options, which may, in some circumstances not support all of the various conditions, criteria, or other features upon which a client application may wish to search. Moreover, when processing search requests to key-value data stores across multiple different key-value data stores, the varying levels of supported features may not provide a uniform or predictable experience to client applications, as not all key-value data stores may support the same conditions, criteria, or other features upon which a client application may wish to search. Therefore, techniques that can determine a result filter for requests to key-value data stores may provide a uniform client application experience by supporting a common set of filtering conditions for results returned from across one or multiple key-value data stores, without having to modify the key-value data stores to support the same filtering criteria.

Figure 1:
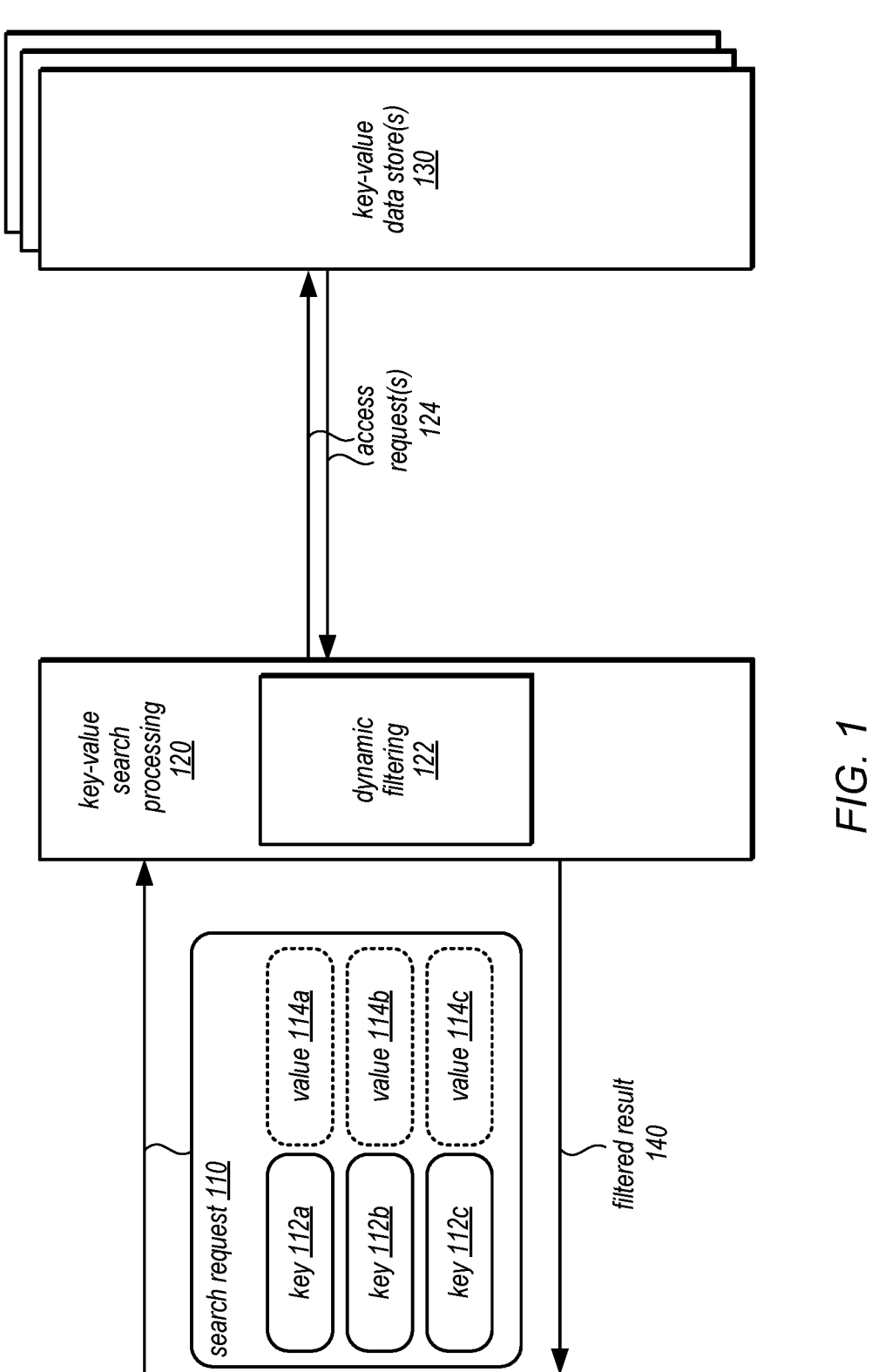
FIG. 1 is a series of block diagrams illustrating determining a result filter for requests to key-value data stores, according to some embodiments.

FIG. 1 is a logical illustration of determining a result filter for requests to key-value data stores, according to some embodiments. Key-value search processing 120 may be one or more computing resources, devices, or systems, such as computing system 1000 discussed below with regard to FIG. 8, which may support search requests, like search request 110 across one (or more) key-value data stores. Key-value search processing 120 may implement a common interface via which search request 110 may be received so that a client application submitting search request 110 need not conform to the particular features supported by different interfaces of key-value data stores 130.

Key-value data store(s) 130 may store data (e.g., different objects, records, documents, etc.) as various sets, tables, or collections, among other groupings, which may be searched by key-value search processing 120. These key-value data stores 130 may organize the different objects, records, or documents by utilizing a key which may identify which one (or ones) of different objects, records, or documents to return. These objects, records, or documents may be stored in a non-relational data format (e.g., a NoSQL data model) which may allow for different objects, records, or documents in the same collection to have different numbers and/or types of values (e.g., attributes, features, fields, etc.).

Key-value search processing 120 may implement dynamic filtering 122, in some embodiments. Dynamic filtering 122 may implement various techniques discussed below with regard to FIGS. 3-7, to determine one or more filter criteria applicable to a search request, like search request 110, to return a filtered result 140. For example, dynamic filtering 122 may determine the number of respective value(s) (e.g., 114a, 114b, and 114c), if any, of respective keys included in search request 110 (e.g., key 112a, 112b, and 112c). Using the number of values for respective keys, dynamic filtering can determine different filtering criteria to be applied as part of generating filtered result 140. For example, dynamic filtering 122 can apply filtering criteria to the initial results received via access requests 124 to key-value data stores 130, or may modify the access requests to apply some (or all) filter criteria at key-value data stores.

Please note that previous descriptions are not intended to be limiting, but are merely provided as a logical example of determining a result filter for requests to key-value data stores.

This specification next includes a general description of a provider network, which may implement a monitoring service to provide results obtained from separate programmatic interfaces for resources in services in the provider network that determine a result filter for requests. Various examples of a provider network, monitoring service, network-based services and clients are discussed, including different components/modules, or arrangements of components/module that may be employed as part of a monitoring service. A number of different methods and techniques to implement determining a result filter for requests to key-value data stores are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
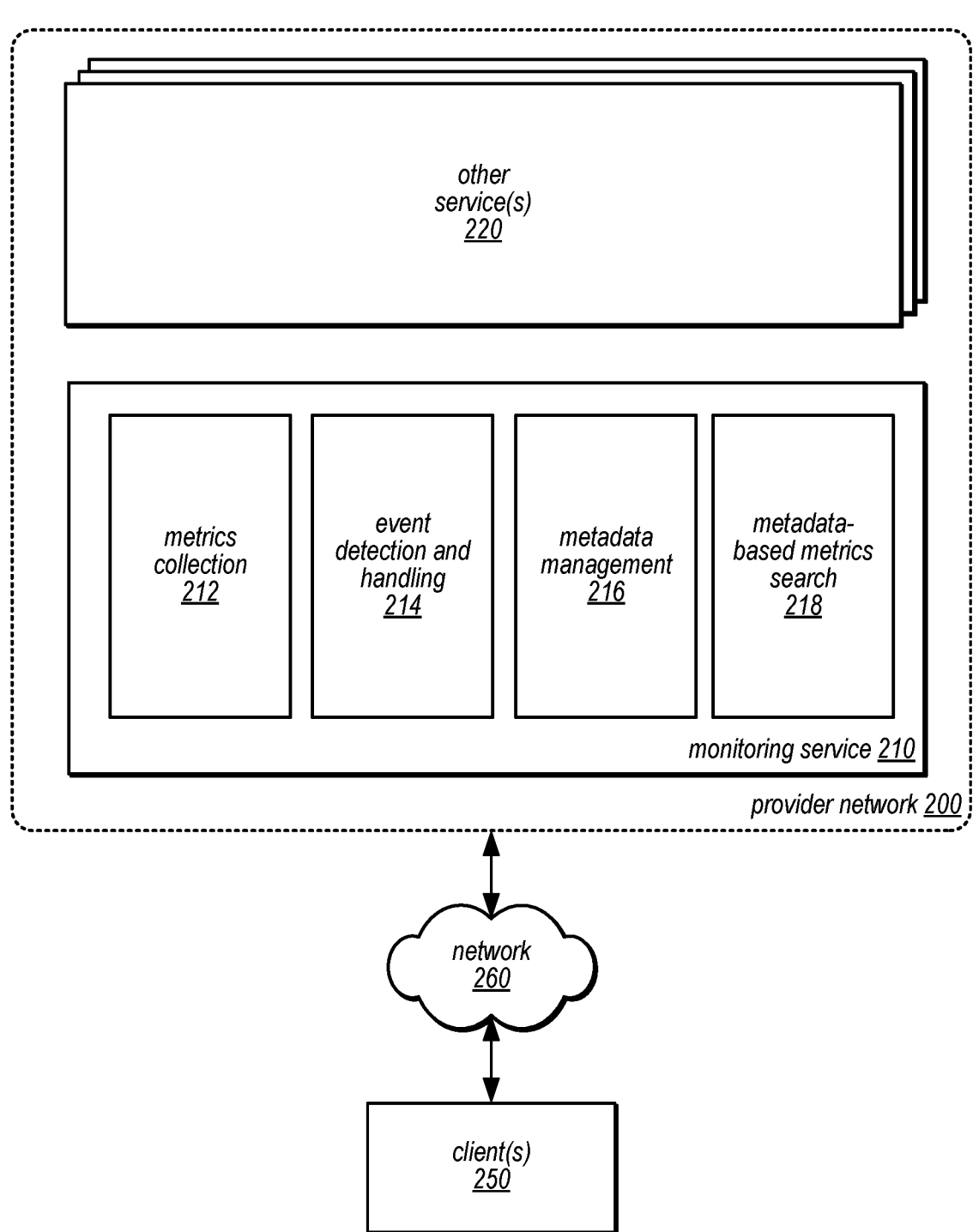
FIG. 2 is block diagram illustrating a provider network that implements multiple different network-based services for clients, including a monitoring service, according to some embodiments.

FIG. 2 is block diagram illustrating a provider network that implements multiple different network-based services for clients, including a monitoring service, according to some embodiments. Provider network 200 may be set up by an entity such as a company or a public sector organization to provide one or more network-based services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like, needed to implement and distribute the infrastructure and services offered by the provider network 200. In at least some embodiments, provider network 200 may be organized into different regions, data centers, or other collections of devices to implement the services offered by provider network 200. Clients 250 may be configured to access via network 260 network-based services implemented as part of provider network 200 to perform various tasks, implement various systems, functions, or applications.

Provider network 200 may implement many different kinds of other services 220, and thus the following discussion of various services is not intended to be limiting. For example, various network-based services 220 may be implemented such as deployment service(s), management service(s), application service(s), and analytic service(s). In some embodiments, provider network 200 may implement storage service(s). Storage service(s) may be one or more different types of services that provide different types of storage. For example, storage service(s) may be an object or key-value data store that provides highly durable storage for large amounts of data organized as data objects. In some embodiments, storage service(s) may include an archive long-term storage solution that is highly-durable, yet not easily accessible, in order to provide low-cost storage. In some embodiments, storage service(s) may provide virtual block storage for other computing devices, such as compute instances implemented as part of a virtual computing service. For example, a virtual block-based storage service may provide block level storage for storing one or more data volumes mapped to particular clients, providing virtual block-based storage (e.g., hard disk storage or other persistent storage) as a contiguous set of logical blocks. Storage service(s) may replicate stored data across multiple different locations, fault tolerant or availability zones, or nodes in order to provide redundancy for durability and availability for access.

In some embodiments, provider network 200 may implement database service(s). Database services may include many different types of databases and/or database schemes. Relational and non-relational databases may be implemented to store data, as well as row-oriented or column-oriented databases. For example, a database service that stores data according to a data model in which each table maintained on behalf of a client contains one or more items, and each item includes a collection of attributes, such as a key value data store. In such a database, the attributes of an item may be a collection of name-value pairs, in any order, and each attribute in an item may have a name, a type, and a value. Some attributes may be single valued, such that the attribute name is mapped to a single value, while others may be multi-value, such that the attribute name is mapped to two or more values.

Provider network 200 may implement networking service(s) in some embodiments. Networking service(s) may configure or provide virtual networks, such as virtual private networks (VPNs), among resources implemented in provider network 200 as well as control access with external systems or devices. For example, networking service(s) may be configured to implement security groups for compute instances in a virtual network. Security groups may enforce one or more network traffic policies for network traffic at members of the security group. Membership in a security group may not be related to physical location or implementation of a compute instance. The number of members or associations with a particular security group may vary and may be configured.

Networking service(s) may manage or configure the internal network for provider network 200 (and thus may be configured for implementing various resources for a client 250). For example, an internal network may utilize IP tunneling technology to provide a mapping and encapsulating system for creating an overlay network on network and may provide a separate namespace for the overlay layer and the internal network layer. Thus, in this example, the IP tunneling technology provides a virtual network topology; the interfaces that are presented to clients 250 may be attached to the overlay network so that when a client 250 provides an IP address that they want to send packets to, the IP address is run in virtual space by communicating with a mapping service (or other component or service not illustrated) that knows where the IP overlay addresses are.

In some embodiments, provider network 200 may implement virtual computing service(s), to provide computing resources. These computing resources may in some embodiments be offered to clients in units called "instances," "containers" or other virtualization schemes, such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor) or machine image. A number of different types of computing devices may be used singly or in combination to implement compute instances, in different embodiments, including general purpose or special purpose computer servers, storage devices, network devices and the like. In some embodiments clients 250 or other any other user may be configured (and/or authorized) to direct network traffic to a compute instance.

Compute instances may operate or implement a variety of different platforms, such as application server instances, general purpose or special-purpose operating systems, platforms that support various interpreted or compiled programming languages such as Ruby, Perl, Python, C, C++ and the like, or high-performance computing platforms) suitable for performing client 250 applications, without for example requiring the client 250 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc., and (in the case of reserved compute instances) reservation term length.

In various embodiments, provider network 200 may implement components to coordinate the metering and accounting of client usage of network-based services, including network-based services, such as by tracking the identities of requesting clients, the number and/or frequency of client requests, the size of data stored or retrieved on behalf of clients, overall storage bandwidth used by clients, class of storage requested by clients, or any other measurable client usage parameter. Provider network 200 may also implement financial accounting and billing service(s), or may maintain a database of usage data that may be queried and processed by external systems for reporting and billing of client usage activity. In certain embodiments, provider network 200 may implement components (e.g., metering service(s)) that may be configured to collect, monitor and/or aggregate a variety of service operational metrics, such as metrics reflecting the rates and types of requests received from clients, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients to enable such clients to monitor their usage of network-based services.

In some embodiments, provider network 200 may implement components to implement user authentication and access control procedures, such as access management service(s), for provider network 200 resources. For example, for a given network-based services request to access a particular compute instance, provider network 200 may implement components configured to ascertain whether the client associated with the access is authorized to configured or perform the requested task. Authorization may be determined such by, for example, evaluating an identity, password or other credential against credentials associated with the resources, or evaluating the requested access to the provider network 200 resource against an access control list for the particular resource. For example, if a client does not have sufficient credentials to access the resource, the request may be rejected, for example by returning a response to the requesting client indicating an error condition.

In various embodiments, provider network 200 may implement a monitoring service 210. Monitoring service 210 may offer various features for gaining visibility into the operation of resources hosted or utilized by other service(s) 220 (e.g., for a user account of provider network). Monitoring service 210 may implement various features, including metrics collection 212 which may track and provide access to various performance metrics of individual resources or groups of resources in other service(s) 220, event detection and handling 214 which may monitor for events and provide alarms, notifications, and/or automated actions (e.g., resource modification) based on various event criteria compared with collected metrics, and metadata management 216, which may allow for various tags, labels, or other information to describe resources, which may then be used by monitoring service 210 (as well as other services 220) to perform various operations with respect to resources identified by their added metadata. As discussed in detail below with regard to FIG. 3, monitoring service 210 may implement metadata-based metrics search 218 to perform search requests across different services, which may include performing pagination across different interfaces.

Network-based services implemented as part of provider network 200 may each implement respective programmatic interfaces, in some embodiments. For example, requests directed to a virtual computing service may be formatted according to an API for the virtual computing service, while requests to storage service(s) may be formatted according to an API for the storage service(s). Different portions of the various APIs may be exposed to external clients, in some embodiments, with some other portions remaining available to internal clients, such as other network-based services in provider network 200.

Clients 250 may encompass any type of client configurable to submit requests to network-based services platform 200, in various embodiments. For example, a given client 250 may include a suitable version of a web browser, or may include a plug-in module or other type of code module configured to execute as an extension to or within an execution environment provided by a web browser. In some embodiments, clients 250 may include sufficient support to send the requests according to various programmatic interfaces for the service, as well as other supported protocols at the resources (e.g., Hypertext Transfer Protocol (HTTP)) for generating and processing network-based service requests without necessarily implementing full browser support. In some embodiments, clients 250 may be configured to generate network-based services requests according to a Representational State Transfer (REST)-style network-based services architecture, a document- or message-based network-based services architecture, or another suitable network-based services architecture. In some embodiments, a client 250 (e.g., a computational client) may be configured to provide access to network-based resource in a manner that is transparent to applications implemented on the client 250 utilizing the provider network resource.

Clients 250 may convey network-based services requests to provider network 200 via network 260, such as search requests to metadata-based metrics search 218 in monitoring service 210. In various embodiments, network 260 may encompass any suitable combination of networking hardware and protocols necessary to establish network-based communications between clients 250 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network. It is noted that in some embodiments, clients 250 may communicate with network-based service using a private network rather than the public Internet.

Figure 3:
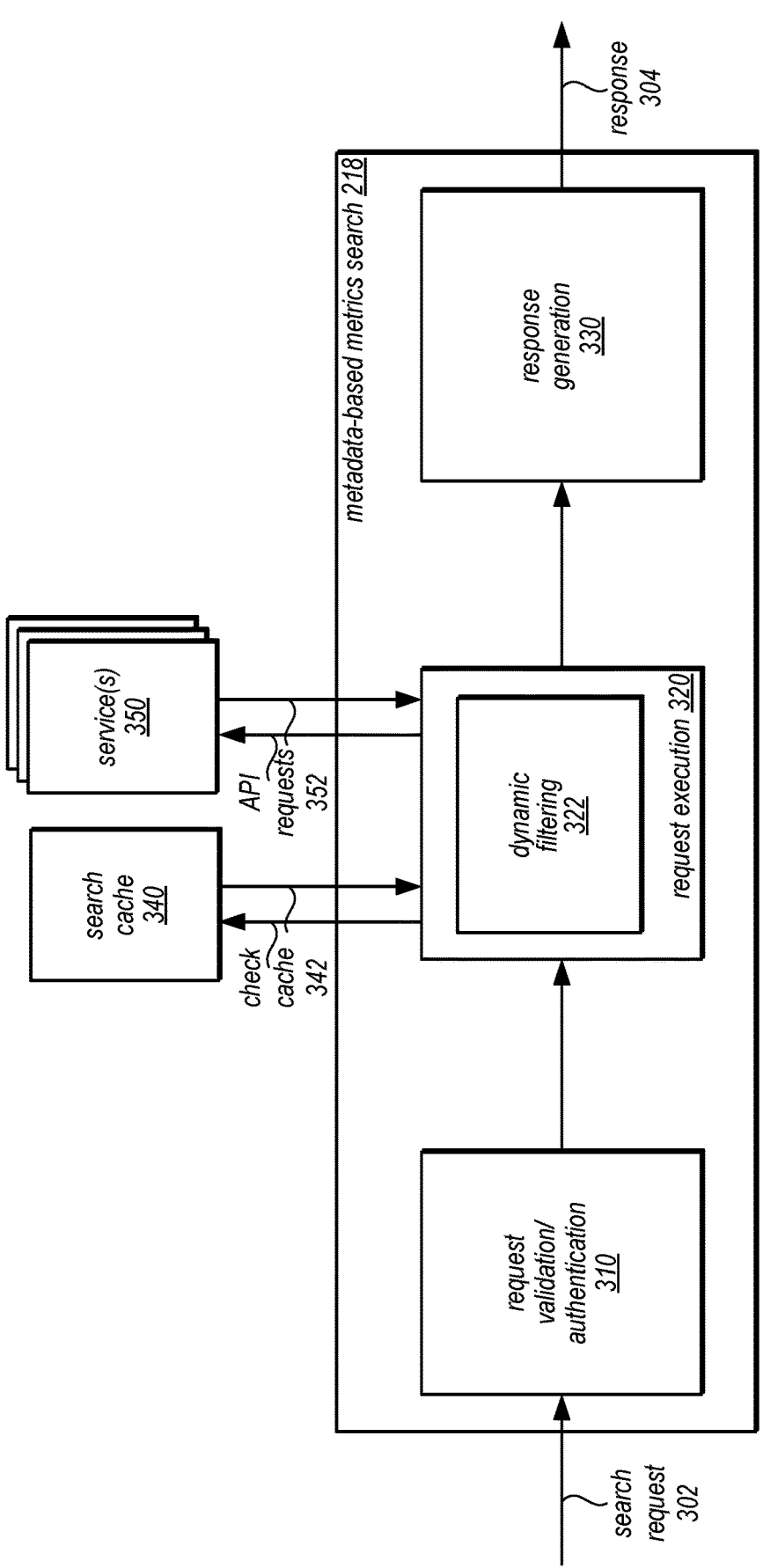
FIG. 3 is a block diagram illustrating metadata-based metrics search for a monitoring service that may determine a result filter for request results obtained from separate programmatic interfaces, according to some embodiments.

FIG. 3 is a block diagram illustrating metadata-based metrics search for a monitoring service that may determine a result filter for request results obtained from separate programmatic interfaces, according to some embodiments. Metadata-based metrics search 218 may support various search requests 302, which may search and obtain data from across multiple different services (or locations within services), in some embodiments. For example, search request 302 may be submitted via an interface (e.g., for monitoring service 210, such as a graphical user interface (GUI), command line, and/or programmatic interface (API) to search various service resources through tags, labels, or other metadata and properties of the resources hosted in the services 220. For example, search requests 302 may allow users to find (and filter) resources using tags, but also to use resource properties (e.g., resource types) as tags, which can then be used to obtain or link to corresponding performance metrics. If, for instance, each computing resource has a "production" tag, label, or other metadata, a search request can be used to aggregate metrics from the computing resources with this "production" tag.

Metadata-based metrics search 218 may implement request validation/authentication 310 to verify the request is authorized and/or valid. For example, identity information which may limit the view of certain performance metrics for certain resources in certain services may be obtained in order to identify whether a request can proceed (or proceed in limited fashion). Validation may ensure that features of the request are correctly specified (e.g., by syntax, existing resources, etc.).

Metadata-based metrics search 218 may implement request execution 320, which may be able to invoke the appropriate APIs or other interface components in order to obtain requested information. In at least some embodiments, a search cache 340 may be implemented which may store the results of prior search requests to use instead of sending API requests 352 to service(s) 350 (which may be various services 220 in FIG. 2). For example, a check 342 of search cache 340 may be performed to identify whether a search request 302 has been previously performed (or a portion of the search request 302) and return a valid result from search cache 340.

In various embodiments, metadata-based metrics search 218 may implement dynamic filtering 322, as discussed in detail below with regard to FIG. 4, which may determine filter criteria to apply to results of API requests 352 or to modify API requests 352 so that service(s) 350 apply one (or more filter criteria). Request execution 320 may apply determined filter criteria to results that are then provided to response generation 330.

Metadata-based metrics search 218 may implement response generation 330 to provide a response 304, in various embodiments. For example, the response may include results, as well as requested formats, manipulations, or other aspects of the results in a response 304.

Figure 4:
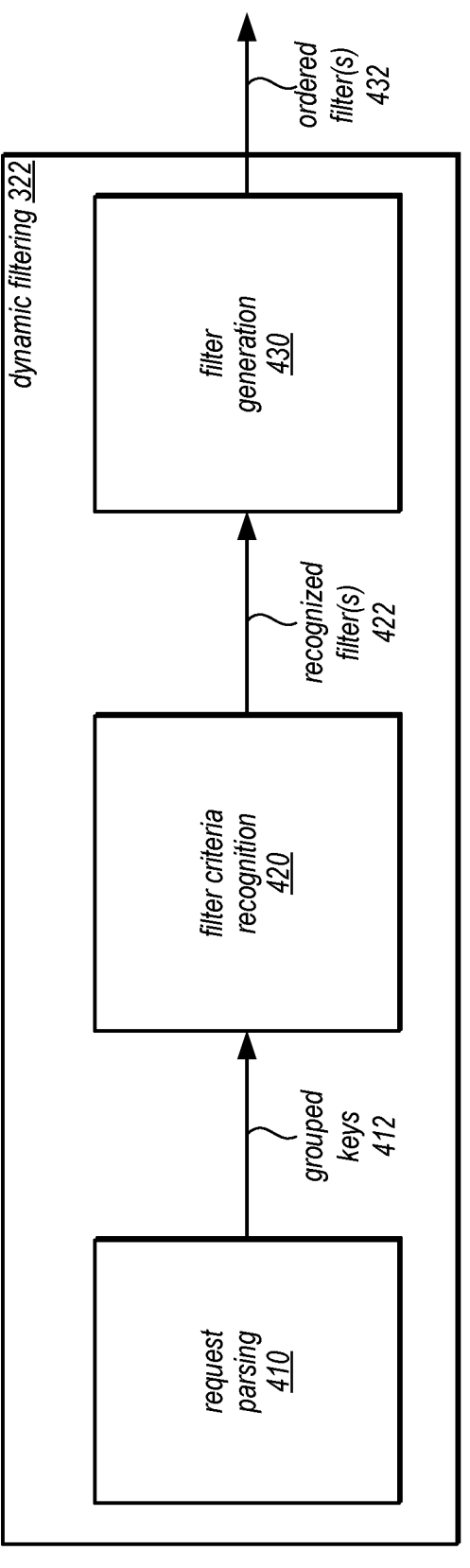
FIG. 4 is a logical block diagram illustrating dynamic filtering, according to some embodiments.

FIG. 4 is a logical block diagram illustrating dynamic filtering, according to some embodiments. Dynamic filtering 322 may implement request parsing 410 to determine keys (and values, if any) that are included in a search request and provide grouped keys 412 to filter criteria recognition 420.

Figure 7:
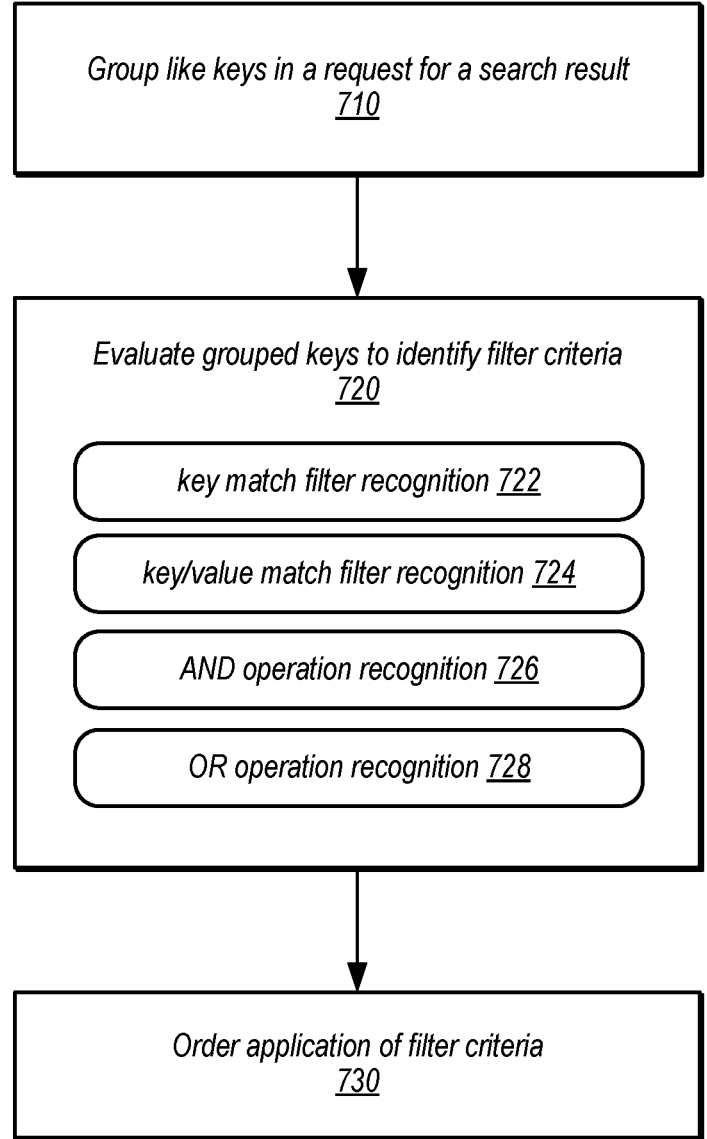
FIG. 7 is a high-level flowchart illustrating various methods and techniques for identifying filter criteria for a search request, according to some embodiments.

Filter criteria recognition 420 may apply different filter criteria recognition techniques, in some embodiments, as discussed in detail below with regard to FIG. 7. For example, filter criteria recognition techniques may include a key match filter recognition technique, which may look for keys with zero values. For those identified keys, a filter criteria may be satisfied if an initial result matches that key (e.g., key="A"). Another filter criteria recognition technique, may be a key/value recognition technique. A key/value match filter recognition technique may be satisfied if a key has a single-one and only one-value, such that the filter criteria may be satisfied if both the key and value match (e.g., if key="A" and value="1"). Another filter criteria recognition technique may be the OR operation recognition. OR operation recognition may be recognized if a same key (e.g., either included once or multiple times in the request) has more than one value (e.g., key="A" value="1", key="A" value="2"). The OR operation may apply an OR Boolean logic operation, such that the filter criteria may be satisfied if a key has any of the specified values (e.g., "1" or "2"). Another filter criteria recognition technique, AND operation recognition may be applied if more than one key with different values is included in the search request. For example, AND operation recognition may recognize ANDs when key="A" and key="B" are both included in a request.

Filter criteria recognition 420 may provide recognized filter(s) 422 to filter generation 430, in some embodiments. Filter generation 430 may generate the data structure, format (e.g., a rewritten search request), or other statement of filter criteria. As indicated at 432, such filter criteria may be ordered in order to apply the appropriate filter criteria to the appropriate data.

FIG. 5 is a logical block diagram illustrating the evaluation of a search request to determine filter criteria, in some embodiments. As discussed in detail below with regard to FIG. 7, different techniques for determining filter criteria based on a number values for a key may be performed. Example search request 510 includes an action to match the select keys from resource type. The example labels are specified by different types of keys, key="group-A", key="env", key="resource-type" and key="resource-type."

As indicated at 520, the keys may be grouped into three key groups, key="group-A", key="env", key="resource-type". Some key groups may have values, like key="env" and key="resource-type" while others may not, such as key "group-A". The groups of keys may be evaluated according to various filter criteria, as indicated at 530. The criteria may be anyLabel that equals group-A may satisfy one filter criteria AND any label with a key=="env" and a value="prod," AND anyLabel with a key="resource-type" and value="XL-1" OR anyLabel with a key="resource-type" and value="XL-2". As a result, the filter criteria may be rewritten as "Return resourceA resources with labels ("group-A" AND "env"="prod" AND "resource-type"=("XL-1" OR "XL-2")).

Figure 6:
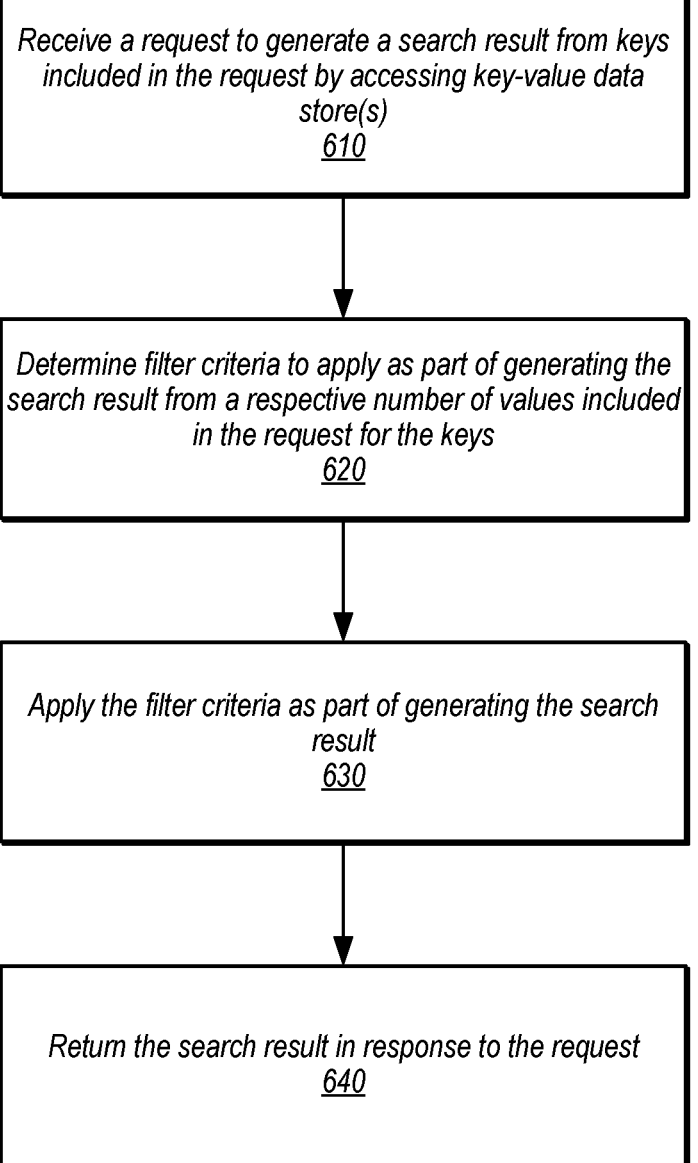
FIG. 6 is a high-level flowchart illustrating various methods and techniques for determining a result filter for requests to key-value data stores, according to some embodiments.

Although FIGS. 2-5 have been described and illustrated in the context of a monitoring service, the various components illustrated and described in FIGS. 2-5 may be easily applied to other applications, systems, or services that may perform search processing over multiple key-value data stores. As such, FIGS. 2-5 are not intended to be limiting as to other embodiments. FIG. 6 is a high-level flowchart illustrating various methods and techniques for determining a result filter for requests to key-value data stores, according to some embodiments. Various different systems and devices may implement the various methods and techniques described below, either singly or working together. For example, a monitoring service, such as described above with regard to FIGS. 2-5 may implement the various methods. Alternatively, a combination of different systems and devices may implement the described techniques. Therefore, the above examples and or any other systems or devices referenced as performing the illustrated methods, are not intended to be limiting as to other different components, modules, systems, or configurations of systems and devices.

As indicated at 610, a request may be received to generate a search result from keys included in the request by access key-value data store(s), in some embodiments. For example, a search request may be received and/or formatted according to an API or other interface that allows for a request to search to specify the key(s) included in the search request, such as shown in the illustrated example in FIG. 5 above. The request may not explicitly state or otherwise include filter criteria in the request, in some embodiments.

As indicated at 620, filter criteria may be determined to apply as part of generating the search result from a respective number of values included in the request for the keys, in some embodiments. For example, as discussed above with regard to FIG. 1, a request may include keys alone (with no values), keys with a single value, or multiple ones of the same key with different values. As discussed in detail below with regard to FIG. 7, the number of values (e.g., zero, one, or more) may be used to determine, at least some, of the filtering criteria.

As indicated at 630, the filter criteria may be applied as part generating the search result, in some embodiments. For example, the filter criteria may be applied after initial search results are received from the key-value stores at a search processing system (e.g., one or more computing resources or devices, such as computing system 1000 discussed below with regard to FIG. 8). Different requests for individual (or multiple) keys may be sent to the key-value data stores, and then the results returned from those key-value data stores may be filtered using the filter criteria (e.g., excluding initial results values that do not satisfy the filter criteria). In some embodiments, the filter criteria may be applied at the key-value data stores, by the key-value data stores. For example, the filter criteria (or a portion thereof, such as a key match filter) may be included as a parameter, flag, feature, or option in a request for a key sent to the key-value data store to apply the filter criteria at the key-value data store in order to return initial filtered results.

As indicated at 640, the search result may be returned in response to the request, in some embodiments. For example, the initial results received from the different key value data stores may be filtered (as discussed above) and combined into a format corresponding to the interface (e.g., API) via which the requested for the search result is received and returned (e.g., to a requesting client). In another example, the filtered initial results may be further filtered (e.g., as not all filter criteria may be supported by key-value data stores), and then combined to return as the search result.

Different techniques for determining which filter criteria to apply to generate a search result may be implemented. FIG. 7 is a high-level flowchart illustrating various methods and techniques for identifying filter criteria for a search request, according to some embodiments. As indicated at 710, like keys (e.g., keys that are the same, such as "key=A") may be all grouped together, in some embodiments (as also shown in FIG. 5 above).

As indicated at 720, the grouped keys may then be evaluated to identify filter criteria, in some embodiments. Different filter recognition techniques may be applied to determine which filter criteria are applicable. For example, a key match filter recognition 722 technique, may look for keys with zero values (e.g., by applying a recognition rule that evaluates the key groups for keys that do not have a value field). For those identified keys, a filter criteria may be satisfied if an initial result matches that key (e.g., key="A"). Another recognition technique, may be a key/value recognition technique, as indicated at 724. A key/value match filter recognition technique 724 may be satisfied if a key has a single—one—value, such that the filter criteria may be satisfied if both the key and value match (e.g., if key="A" and value="1").

Another filter recognition technique may be the OR operation recognition, as indicated at 728. OR operation recognition may be recognized if a same key (e.g., either included once or multiple times in the request) has more than one value (e.g., key="A" value="1", key="A" value="2"). The OR operation may apply an OR Boolean logic operation, such that the filter criteria may be satisfied if a key has any of the specified values (e.g., "1" or "2"). Another filter recognition, AND operation recognition, as indicated at 726, may be applied if more than one key with different values is included in the search request. For example, AND operation recognition 726 may recognize ANDs when key="A" and key="B" are both included in a request.

As indicated at 730, application of the filter criteria may be ordered, in some embodiments. For example, the filter criteria may be ordered corresponding to the keys to which the filter criteria applies, such as ordering the ANDs and ORs according to their respective location in the key listing. The ordering may be specified as a rewritten criteria or other format which may indicated to search processing the order of filter criteria to be applied, in some embodiments.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the client and/or provider network described herein). The various methods as illustrated in the figures and described herein represent example embodiments of methods. The order of any method may be changed, and various elements may be added, reordered, combined, omitted, modified, etc.

Figure 8:
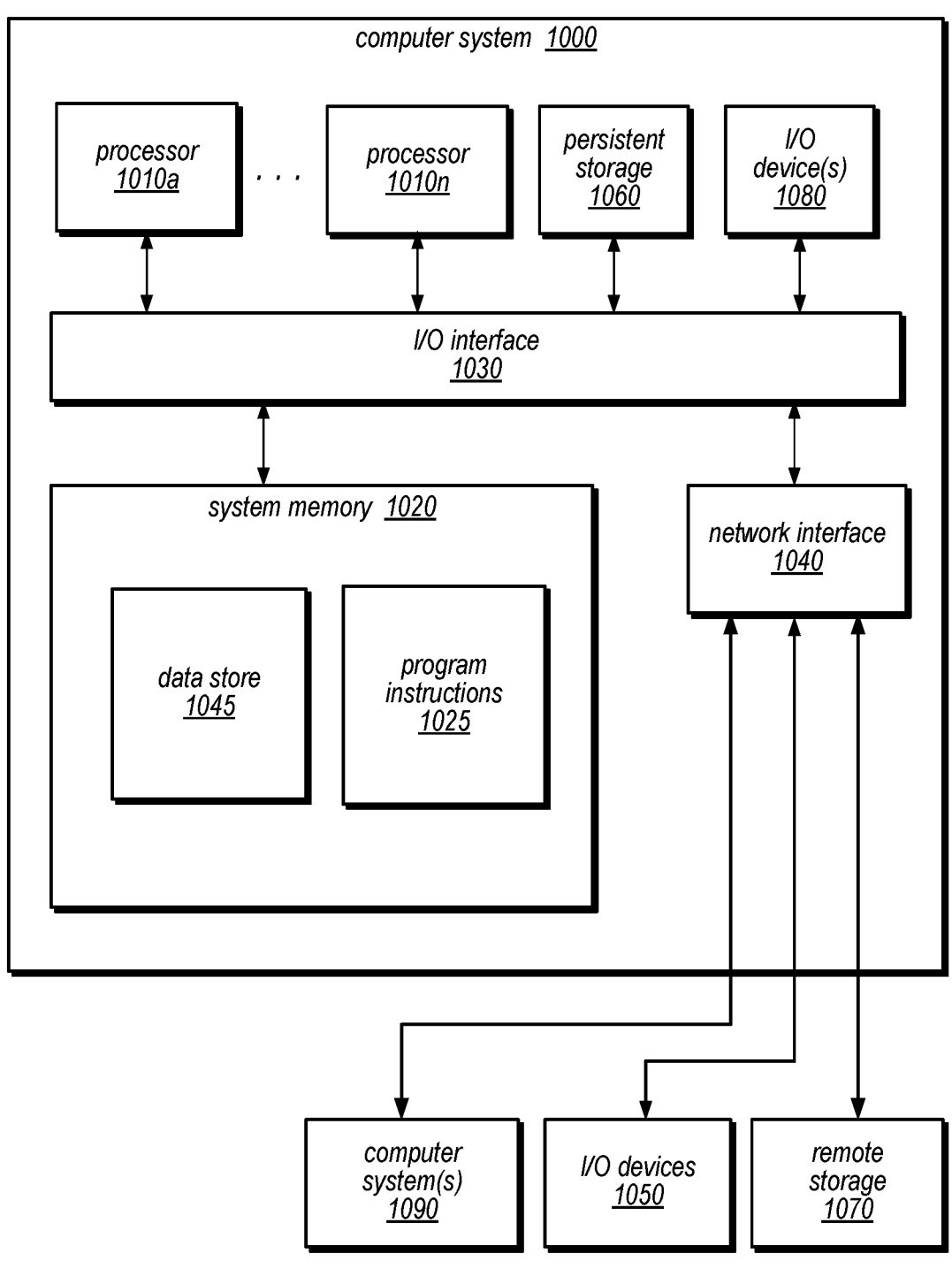
FIG. 8 is a block diagram illustrating an example computing system, according to some embodiments.

Embodiments of determining a result filter for requests to key-value data stores across network-based services as described herein may be executed on one or more computer systems, which may interact with various other devices. FIG. 8 is a block diagram illustrating an example computer system, according to various embodiments. For example, computer system 1000 may be configured to implement nodes of a provider network, network-based service, a data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory).

System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a service platform specific language engine, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example.

Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor, cause the at least one processor to:

receive a request to generate a search result that match a plurality of keys included in the request, the plurality of keys identifying respective data stored in a plurality of key-value data stores, wherein the plurality of key-value data stores do not support a same set of features for search;

determine, using a plurality of different filter recognition techniques to select from a plurality of different filter criteria, one or more filter criteria to apply as part of generating the search result, wherein the request does not explicitly state the one or more filter criteria, and wherein to determine the one or more filter criteria, the program instructions cause the at least one processor to:

based on respective name value pairs of individual ones of the plurality of keys included in the request, determine a number of times a key with a same name is included in the request and a number of values specified in the request for the key with the same name;

evaluate, using the plurality of different filter recognition techniques, the number of times the key with the same name is included in the request and the number of values specified in the request to identify the one or more filter criteria, wherein the one or more filter criteria correspond to whether the number of values specified in the request for the key with the same name is zero values, one value, or more than one value; and order application of the one or more filter criteria;

cause application of the one or more filter criteria as part of causing the search result to be generated; and return the search result in response to the request.

2. The system of claim 1, wherein to cause the application of the one or more filter criteria as part of causing the search result to be generated, the program instructions cause the at least one processor to apply the filter criteria with respect to individual results respectively received from the plurality of key-value data stores in response to one or more access requests sent to the plurality of key-value data stores.

3. The system of claim 1, wherein the respective number of values for one of the plurality of keys is one.

4. The system of claim 1, wherein the at least one processor and the memory are implemented as part of a monitoring service of a provider network, wherein the plurality of key-value data stores describe various attributes of one or more services of the provider network, and wherein the search request is a label search request for one or more resources implemented at the one or more services.

5. A method, comprising:

receiving a request to generate a search result from a plurality of keys included in the request by accessing one or more key-value data stores of a plurality of key-value data stores, wherein the plurality of key-value data stores do not support a same set of features for search;

based on respective name value pairs of individual ones of the plurality of keys included in the request, determining a number of times a key with a same name is included in the request and a number of values specified in the request for the key with the same name;

determining, using a plurality of different filter recognition techniques to select from a plurality of different filter criteria, one or more filter criteria to apply as part of generating the search result, wherein the one or more filter criteria are determined from the number of times the key with the same name is included in the request and the number of values specified in the request, wherein the one or more filter criteria correspond to whether the number of values specified in the request for the key with the same name is zero values, one value, or more than one value in the request, and wherein the request does not explicitly state the one or more filter criteria;

applying the one or more filter criteria as part of generating the search result; and returning the search result in response to the request.

6. The method of claim 5, wherein applying the one or more filter criteria as part of generating the search result comprises sending respective requests to obtain different portions of the result to the one or more key-value data stores, wherein the respective requests include requests to apply the filter criteria at the one or more key-value data.

7. The method of claim 5, wherein determining, using the plurality of different filter recognition techniques to select from the plurality of different filter criteria, the one or more filter criteria to apply as part of generating the search result from the respective number of values included in the request for the plurality of keys, comprises:

ordering application of the one or more filter criteria.

8. The method of claim 5, wherein the determined one or more filtering criteria comprises a determined number of OR operations.

9. The method of claim 5, wherein the determined one or more filtering criteria comprises a determined number of AND operations.

10. The method of claim 5, wherein the number of values of the same key is more than one value.

11. The method of claim 5, wherein the number of values of the same key is zero.

12. The method of claim 5, wherein applying the one or more filter criteria as part of generating the search result comprises applying the filter criteria with respect to individual results respectively received from the one or more key-value data in response to one or more access requests sent to the one or more key-value data stores.

13. The method of claim 5, wherein the one or more key-value data stores are a plurality of key-value data stores, and wherein the search request is performed as part of federated search processing across the plurality of key-value data stores.

14. One or more non-transitory, computer-readable storage media, storing program instructions that when executed on or across one or more computing devices cause the one or more computing devices to implement:

receiving a request to generate a search result that match a plurality of keys included in the request by accessing one or more key-value data stores of a plurality of key value data stores, wherein the plurality of key-value data stores do not support a same set of features for search;

based on respective name-value pairs of individual ones of the plurality of keys included in the request, determining a number of times a key with a same name is included in the request and a number of values specified in the request for the key with the same name;

determining, using a plurality of different filter recognition techniques to select from a plurality of different filter criteria, one or more filter criteria to apply as part of generating the search result, wherein the one or more filter criteria are determined from the number of times the key with the same name is included in the request and the number of values specified in the request, wherein the number of values specified in the request for the key with the same name is zero values, one value, or more than one value in the request, and wherein the request does not explicitly state the one or more filter criteria;

causing application of the one or more filter criteria as part of causing the search result to be generated; and returning the search result in response to the request.

15. The one or more non-transitory, computer-readable storage media of claim 14, wherein, in causing application of the one or more filter criteria as part of generating the search result, the program instructions cause the one or more computing devices to implement applying the filter criteria with respect to individual results respectively received from the one or more key-value data in response to one or more access requests sent to the one or more key-value data stores.

16. The one or more non-transitory, computer-readable storage media of claim 14, wherein, in determining, using the plurality of different filter recognition techniques to select from the plurality of different filter criteria, the one or more filter criteria to apply as part of generating the search result from the respective number of values included in the request for the plurality of keys, the program instructions cause the one or more computing devices to implement:

ordering application of the one or more filter criteria.

17. The one or more non-transitory, computer-readable storage media of claim 14, wherein the determined one or more filtering criteria comprises a determined number of AND operations.

18. The one or more non-transitory, computer-readable storage media of claim 14, wherein the number of values of the same key is more than one value.

19. The one or more non-transitory, computer-readable storage media of claim 14, wherein the number of values of the same key is one.

20. The one or more non-transitory, computer-readable storage media of claim 14, wherein the one or more key-value data stores are a plurality of key-value data stores, and wherein the search request is performed as part of federated search processing across the plurality of key-value data stores.

\* \* \* \* \*